Figure 1:
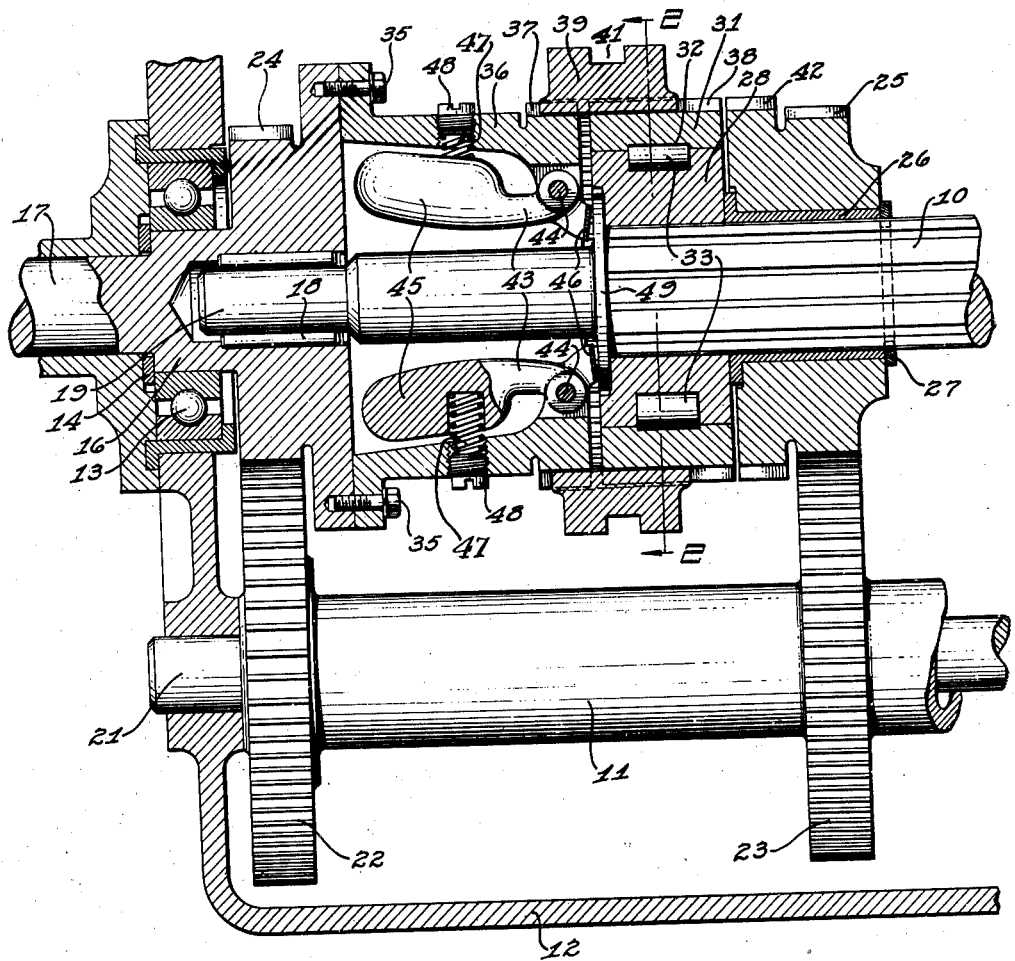

Dec. 4, 1934.  M. TIBBETTS  1,983,250

TRANSMISSION MECHANISM

Filed Sept. 24, 1931

Inventor

Milton Tibbetts

Patented Dec. 4, 1934

1,983,250

UNITED STATES PATENT OFFICE 1,983,250

TRANSMISSION MECHANISM

Milton Tibbetts, Detroit, Mich., assignor to Packard Motor Car Company, Detroit, Mich., a corporation of Michigan Application September 24, 1931, Serial No. 564,827

8 Claims. (Cl. 192—48)

This invention relates to motor vehicles and particularly to transmission systems for motor vehicles which include one-way clutches or free wheeling mechanisms.

As free wheeling is being used today, it will not transmit power from the rear wheels of a motor vehicle to the engine, unless additional mechanism is provided for eliminating the free wheeling. This additional mechanism will permit the use of the engine as a brake, or of the car as a means for starting the engine, and sometimes is added to the conventional gear shift lever, or sometimes is an entirely separate lever, and because of its being additional mechanism, is not altogether desirable. In fact, even with an additional lever, the shift from free wheeling gear to conventional gear or from neutral to conventional gear is difficult to make satisfactorily.

There is furthermore the difficulty in the free wheeling car that one spark failure in a cold motor is apt to cause the motor speed to fall, and, because the wheels will not prevent this reduction in speed, the motor misses fire again and stalls completely. Furthermore, a free wheeling car cannot readily use its engine as a brake.

In a car equipped with a transmission embodying my invention, the vehicle operator will be able to free wheel at all times, but will not be troubled by his motor's stalling. I have added to a free wheeling transmission, a mechanism for transmitting drive from the rear wheels to the engine whenever such transmission of power is necessary to prevent such stalling and whenever it is desired to use the engine as a partial brake.

In inserting this mechanism, I have taken advantage of the fact that the cranking speed, or the speed at which a motor will commence to fire and run under its own power, is generally lower than the speed at which it will continue to run with satisfaction under its on power. For example, in some automobiles today the cranking speed is approximately 125 R. P. M. and the idling speed is in the neighborhood of 300 R. P. M. If my device were to be installed in a motor vehicle equipped with a motor with these characteristics, it would result in rotating the crankshaft at speeds below 300 and in free wheeling that is one-way driving from the motor to the wheels, at speeds above 300 R. P. M. My invention, however, is not to be thought applicable only to a motor of these characteristics. I have chosen these figures merely as examples.

An object of this invention is to provide a transmission mechanism for motor vehicles in which free wheeling drive results above a predetermined rate of rotation and in which a drive in either direction results below the predetermined rate of rotation.

Another object of the invention is to provide a free wheeling transmission in which a positive driving connection is automatically established in a predetermined range of motor speed.

Another object of this invention is to provide means whereby one shaft will impart rotation to another in such a way that the second shaft will never thus be rotated above a predetermined rate.

Another object of the invention is to provide a free wheeling transmission in which centrifugally controlled clutch means will establish a driving connection from the driven member to the driving member in a predetermined range of driving member speed.

Figure 2:
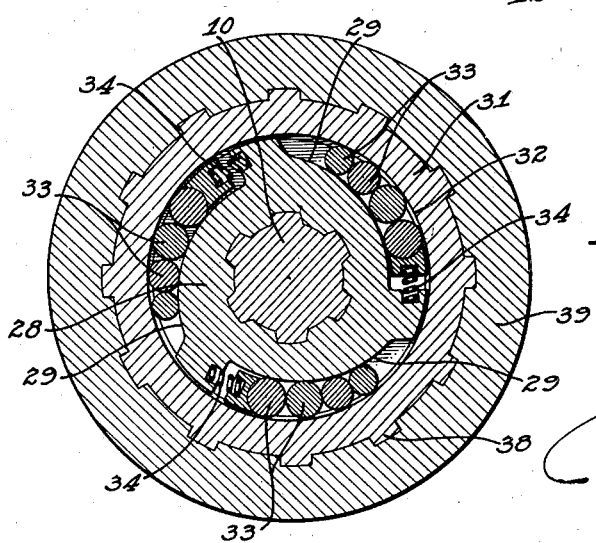

Other objects of the invention will appear from the following description taken in connection with the drawing, which forms a part of this specification, and in which:

Fig. 1 is a longitudinal sectional view, partly in elevation, through a portion of a transmission mechanism embodying the invention, and Fig. 2 is a sectional view taken substantially on the line 2—2 of Fig. 1.

Referring to the drawing, in Fig. 1 is shown a portion of a motor vehicle transmission mechanism having a splined transmission or driven shaft 10 and a countershaft or gear spool 11 mounted in the housing or transmission case 12. The front wall of the housing 12 carries a suitable radial thrust bearing 13 and an axial thrust bearing or washer 14 against which bears the enlarged rear end 16 of a driving shaft 17. Such driving shaft may be the vehicle clutch shaft driven from the vehicle engine or other source of power through conventional clutch mechanism, not shown. The enlarged end 16 of the clutch shaft is formed with an axial recess for the reception of a bearing 18 in which is journaled the reduced forward end 19 of the driven shaft 10. The rear end of the driven shaft is supported in the rear wall of the housing 12 and is connected in the usual way to the propeller shaft to drive the motor vehicle.

The countershaft 11 may be in the form of a hollow spool or gear cluster mounted to rotate on an arbor 21 supported at its ends by the transmission housing walls. This spool is formed with a number of integral gears 22, 23 and others, not shown, if desirable. Of these, the gear 22 is in constant mesh with a gear or pinion 24 formed on the enlarged end 16 of the clutch shaft 17, so that the countershaft 11 is thus continuously driven. The gear 23 is also continuously in mesh with a gear 25 which is rotatably mounted on a bearing sleeve 26 pressed, or otherwise rigidly mounted, on the shaft 10 and held against axial movement by a retaining ring 27 as will be readily understood.

Non-rotatably mounted on the driven member 10 is a collar 28, its outer circumference being grooved with cam shaped depressions, as shown at 29 in Fig. 2, which function as a part of a roller clutch mechanism. An outer ring element 31 cooperates with the collar 28 to form a one-way driving device, in which the drive is transmitted between the eccentrically formed grooves 29 and the inner circumferential groove 32 on the outer ring element, by rollers 33 urged by springs 34 into the narrow portions of the eccentrically shaped grooves formed between the collar and the ring element.

A projecting cylindrically shaped member 36, secured to the clutch shaft by bolts 35, projects to a point adjacent the outer portion 31 of the one-way driving device. On this extension are formed clutch teeth 37. The outer ring element 31 has clutch teeth 38 formed thereon and slidably mounted on these teeth is a positive clutch member 39 having an external groove 41 adapted to receive a shifter fork (not shown) which fork may slide the clutch member into engagement with the teeth 37 on the member 36 or into engagement with teeth 42 formed on the gear 25 while still engaging the teeth 38.

Thus it is seen that either a direct or a geared free wheeling drive may be provided between the driving member and the driven member by shifting the positive clutch member 39.

To accomplish the objects of this invention I have provided additional driving mechanism between the clutch shaft and the transmission shaft, which is arranged to drive the engine from the rear wheels, and around the one-way driving device. This mechanism is thus independent of the free wheeling unit, and its operation is not dependent upon the position of the positive clutch element 39.

This additional driving mechanism includes a series of levers 43 pivoted at points 44 circumferentially arranged around the interior of the cylindrical extension on the clutch shaft. These levers are formed with weights 45 on one side of the pivots and with friction faces 46 on the other side of the pivots. The weights are adapted to bear against springs 47 guided in recesses in the weights or in the cylindrical extension. The spring seats are radially adjustable by means of screw plugs 48 and this adjustment thus permits of variation in the range of movement of the pivoted levers.

The frictional faces on the other ends of the levers form together one-half of a friction clutch and are adapted to abut, upon pivotal movement of the levers, against a flange 49 formed on the driven shaft 10.

In operation, it will be seen that the springs normally urge the frictional faces against the flange, but as soon as the speed of revolution of the motor exceeds a predetermined figure, preferably the cranking speed, the mass of the weights automatically forces them outwards due to their inertia, and the frictional clutch formed between the friction faces and the flange is disengaged.

The centrifugal force of the weights at the predetermined speed is designed to be greater than the centripetal force of the springs. Below this speed the actuating force of the springs pushes the weights inwardly and engages the friction clutch to transmit driving effort from the transmission shaft 10 to the clutch shaft and thereby tends to prevent stalling of the motor. Thus it may be said that the springs assist in driving the driving member from the driven member.

The predetermined speed range, during which the friction clutch will come into operation, will vary for different types of motors and even for different motors of the same type. In general, however, motor vehicle engines will idle at a speed in the neighborhood of 300 R. P. M. and will start firing if cranked at a speed in the neighborhood of 125 R. P. M. In such a case, it will be clear that the several variables of the construction shown should be designed to give a positive engagement of the friction clutch at 125 R. P. M. and to result in a complete disengagement of the friction clutch at a speed below 300 R. P. M. Thus, if the engine should stall and begin to stop, the friction clutch will begin to transmit to it the driving force of the rear wheels at a speed sufficient to start the motor again and, if the motor speed continues to fall, the driving power transmitted by the clutch will increase until at slowest speeds, the friction clutch will be positively engaged by the springs and will tend to prevent any further decrease in the speed of the motor thus engaging the driving and driven shafts in a drive transmitting relationship opposite to that brought about by normal operation of the vehicle.

It should be understood that the numerical values for the cranking and idling speeds may vary considerably, but the minimum cranking speed will always be below the idling speed and consequently my device will always function to prevent the engine's stalling.

While I have herein described in some detail a specific embodiment of my invention, which I deem to be new and advantageous and may specifically claim, I do not desire it to be understood that my invention is limited to the exact details of the invention, or its present application, as it will be apparent that changes may be made therein without departing from the spirit or scope of my invention.

Having thus described my invention, what I claim and desire to be secured by Letters Patent is:

1. In a motor vehicle having a free wheeling transmission mechanism, a driving member associated with the motor of said vehicle, a driven member associated with the road wheels of said vehicle, said members being engageable in driving relationship, and speed controlled means associated with said members and adapted to transmit power between said members in a direction opposite to that of the free wheeling mechanism during a fixed speed range only.

2. In a motor vehicle transmission mechanism, a driving member associated with the motor of said vehicle, and a driven member associated with the road wheels of said vehicle, said members being connected in one-way two-speed driving relationship, and automatic centrifugally controlled spring actuated means forming a driving connection from the driven member to the driving member during a fixed speed range only.

3. In a motor vehicle transmission mechanism, a driving member associated with the motor of said vehicle, and a driven member associated with the road wheels of said vehicle, one-way driving means connecting said members and including geared and direct driving devices, shiftable means for selecting the driving device to be engaged, and automatically controlled spring actuated means forming a driving connection from the driven member to the driving member during a fixed speed range only.

4. In a motor vehicle transmission mechanism, the combination of a driving member associated with the motor of the vehicle, a driven member associated with the road wheels thereof, means connecting said driving and driven members for free-wheeling drive from motor to wheels, and centrifugally actuated means for effecting a driving connection between said members below, and disconnecting said driving connection between said members above, a predetermined speed of one of said members.

5. In a motor vehicle transmission mechanism, the combination of a driving member associated with the motor of the vehicle, a driven member associated with the road wheels thereof, means connecting said driving and driven members for free-wheeling drive from motor to wheels, and centrifugally actuated means for effecting a driving connection between said members below, and disconnecting said driving connection between said members above, a predetermined speed of said driving member regardless of the relative speed of said members.

6. In a motor vehicle transmission mechanism, the combination of a driving member associated with the motor of the vehicle, a driven member associated with the road wheels thereof, means connecting said driving and driven members for free-wheeling drive from motor to wheels, and means for effecting a driving connection between said members when the motor falls below its normal idling speed and for disconnecting said latter driving connection when the motor again reaches its idling speed regardless of the relative speed between the members.

7. In a motor vehicle transmission mechanism, the combination of a driving member associated with the motor of the vehicle, a driven member associated with the road wheels thereof, means connecting said driving and driven members for free-wheeling drive from motor to wheels, and a centrifugally actuated clutch forming a driving connection between said members in both directions when the motor speed falls below a predetermined rate and for disconnecting said clutch immediately the motor speed is raised above said rate.

8. In a motor vehicle transmission mechanism, the combination of a driving member associated with the motor of the vehicle, a driven member associated with the road wheels thereof, means connecting said driving and driven members for free-wheeling or one direction drive from motor to wheels, for connecting said driving member to be driven by said driven member when the speed of said driving member falls below a predetermined speed and for disconnecting that connection upon return to the higher speed regardless of the relative speed between said members.

MILTON TIBBETTS.